United States Patent
Wu

(10) Patent No.: US 10,511,980 B2
(45) Date of Patent: Dec. 17, 2019

(54) DEVICE AND METHOD OF HANDLING SYSTEM INFORMATION IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/682,571

(22) Filed: Aug. 22, 2017

(65) Prior Publication Data

US 2018/0054745 A1 Feb. 22, 2018

Related U.S. Application Data

(60) Provisional application No. 62/378,193, filed on Aug. 22, 2016.

(51) Int. Cl.
*H04W 16/28* (2009.01)
*H04W 72/12* (2009.01)

(52) U.S. Cl.
CPC ....... *H04W 16/28* (2013.01); *H04W 72/1273* (2013.01)

(58) Field of Classification Search
CPC .......................... H04W 16/28; H04W 72/1273
USPC .......................................................... 370/329
See application file for complete search history.

(56) References Cited

U.S. PATENT DOCUMENTS

| | | | |
|---|---|---|---|
| 2014/0112220 A1* | 4/2014 | Kwak | H04B 7/0695 370/294 |
| 2014/0120926 A1* | 5/2014 | Shin | H04W 56/00 455/450 |
| 2016/0234736 A1* | 8/2016 | Kubota | H04W 36/0083 |
| 2016/0234759 A1* | 8/2016 | Kubota | H04W 48/14 |
| 2017/0303263 A1* | 10/2017 | Islam | H04B 7/0408 |
| 2017/0311353 A1* | 10/2017 | Liu | H04W 56/0015 |
| 2018/0248601 A1* | 8/2018 | Kishiyama | H04B 7/10 |

OTHER PUBLICATIONS

3GPP TSG-RAN WG2 Meeting #95 R2-164792, Aug. 22, 2016.

* cited by examiner

*Primary Examiner* — Faisal Choudhury
(74) *Attorney, Agent, or Firm* — Winston Hsu

(57) ABSTRACT

A network for transmitting system information (SI) to a plurality of communication devices comprises a storage device for storing instructions and a processing circuit coupled to the storage device. The processing circuit is configured to execute the instructions stored in the storage device. The instructions comprise transmitting first SI on a wide beam on a carrier, wherein the first SI comprises a first beam configuration; transmitting second SI on a first narrow beam on the carrier according to the first beam configuration, wherein the second SI comprises scheduling information and a second beam configuration; and transmitting third SI on a second narrow beam on the carrier according to the scheduling information and the second beam configuration.

10 Claims, 11 Drawing Sheets

DEVICE AND METHOD OF HANDLING SYSTEM INFORMATION IN A WIRELESS COMMUNICATION SYSTEM

CROSS REFERENCE TO RELATED APPLICATIONS

This application claims the benefit of U.S. Provisional Application No. 62/378,193, filed on Aug. 22, 2016, which is incorporated herein by reference.

BACKGROUND OF THE INVENTION

1. Field of the Invention

The present invention relates to a communication device and a method used in a wireless communication system, and more particularly, to a communication device and a method of handling system information in a wireless communication system.

2. Description of the Prior Art

A New Radio (NR) Access Technology, e.g., fifth generation (5G), is developed in 3rd Generation Partnership Project (3GPP). A NR system is able to support frequency bands up to 100 GHz. To compensate increased path loss of higher frequency bands, the need for beam forming is identified.

In lower frequency bands (e.g., the current LTE bands <6 GHz) a required cell coverage area may be provided by forming a wide sector beam for transmitting downlink (DL) common channels. However, the cell coverage area is reduced with the same antenna gain, when the wide sector beam is utilized on higher frequency bands (>>6 GHz). Thus, a higher antenna gain is needed to compensate the increased path loss, to provide the required cell coverage area on the higher frequency bands. To increase the antenna gain over the wide sector beam, a greater antenna array (a number of antenna elements ranging from tens to hundreds) may be used for forming a high gain beam.

SUMMARY OF THE INVENTION

The present invention therefore provides a communication device and method for handling system information (SI) in a wireless communication system to solve the abovementioned problem.

A network for transmitting SI to a plurality of communication devices comprises a storage device for storing instructions and a processing circuit coupled to the storage device. The processing circuit is configured to execute the instructions stored in the storage device. The instructions comprise transmitting first SI on a wide beam on a carrier, wherein the first SI comprises a first beam configuration; transmitting second SI on a first narrow beam on the carrier according to the first beam configuration, wherein the second SI comprises second scheduling information and a second beam configuration; and transmitting third SI on a second narrow beam on the carrier according to the second scheduling information and the second beam configuration.

A communication device for receiving SI from a network comprises a storage device for storing instructions and a processing circuit coupled to the storage device. The processing circuit is configured to execute the instructions stored in the storage device. The instructions comprise receiving first SI on a wide beam on a carrier, wherein the first SI comprises a first beam configuration; receiving second SI on a first narrow beam on the carrier according to the first beam configuration, wherein the second SI comprises scheduling information and a second beam configuration; and receiving third SI on a second narrow beam on the carrier according to the scheduling information and the second beam configuration.

A communication device for receiving SI from a network comprises a storage device for storing instructions and a processing circuit coupled to the storage device. The processing circuit is configured to execute the instructions stored in the storage device. The instructions comprise receiving SI on a narrow beam on a carrier according to a beam configuration and a scheduling configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
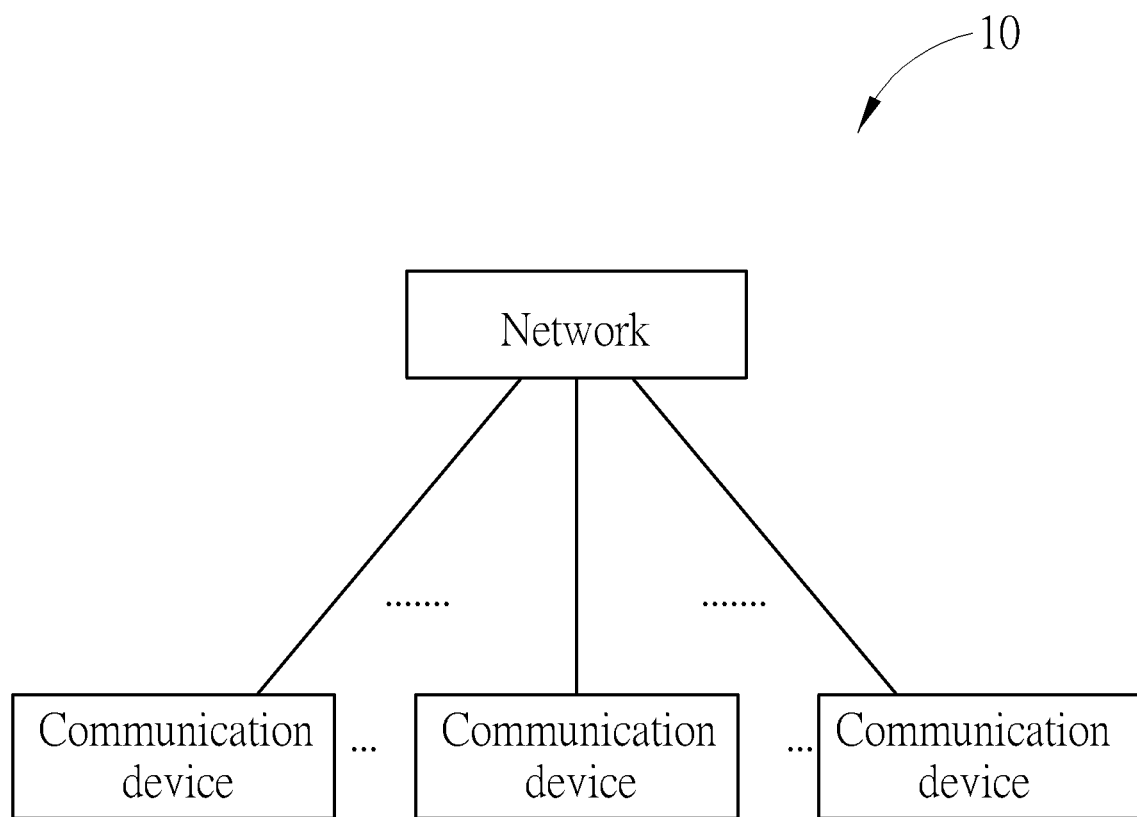
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, i.e. frequency-division duplexing (FDD), time-division duplexing (TDD) or flexible duplexing.

In FIG. 1, the network and the communication devices are simply utilized for illustrating the structure of the wireless communication system 10. The network may be an evolved universal terrestrial radio access network (E-UTRAN) including at least one evolved Node-B (eNB), or a fifth generation (5G) (or called new radio, NR) radio access network including at least one 5G BS which employs orthogonal frequency-division multiplexing (OFDM) and/or non-OFDM and transmission time interval smaller than 1 millisecond (ms) (e.g., 100 or 200 microseconds), to communication with the communication devices. In general, a BS may also be used to refer to the eNB or the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In general, a high gain beam is narrower than a wide sector beam. Hence, the high gain beam for transmitting DL common channels is needed to cover a required cell coverage area. The NR BS needs to sweep through the cell coverage area in a time domain by activating different subsets of concurrent high gain beams at a given time. Thus, for the NR communication, a sweeping subframe may be introduced to provide a coverage area for a common control channel signalling periodically with a beam forming. The sweeping subframe includes sweeping blocks (SBs) where a single SB covers a specific area of the cell with a set of active high gain beams. Depending on a number of active high gain beams in a SB and the total number of the high gain beams required for covering the cell coverage area, multiple SBs may be needed.

The NR BS may be able to address only a limited number of directions, i.e., beams, at a time in a given cell requiring the beam sweeping to be used for provisioning of synchronization signals (SSs) and cell/beam reference signals (RSs) to the UE such that the UE is able to synchronize to the cell in the coverage area. The beam sweeping is also used for provisioning system information (SI) as well as paging information to the UE. The same information (i.e. the SSs, the RSs and/or the SI) may need to be transmitted to multiple directions to serve UEs in a cell.

Figure 2:
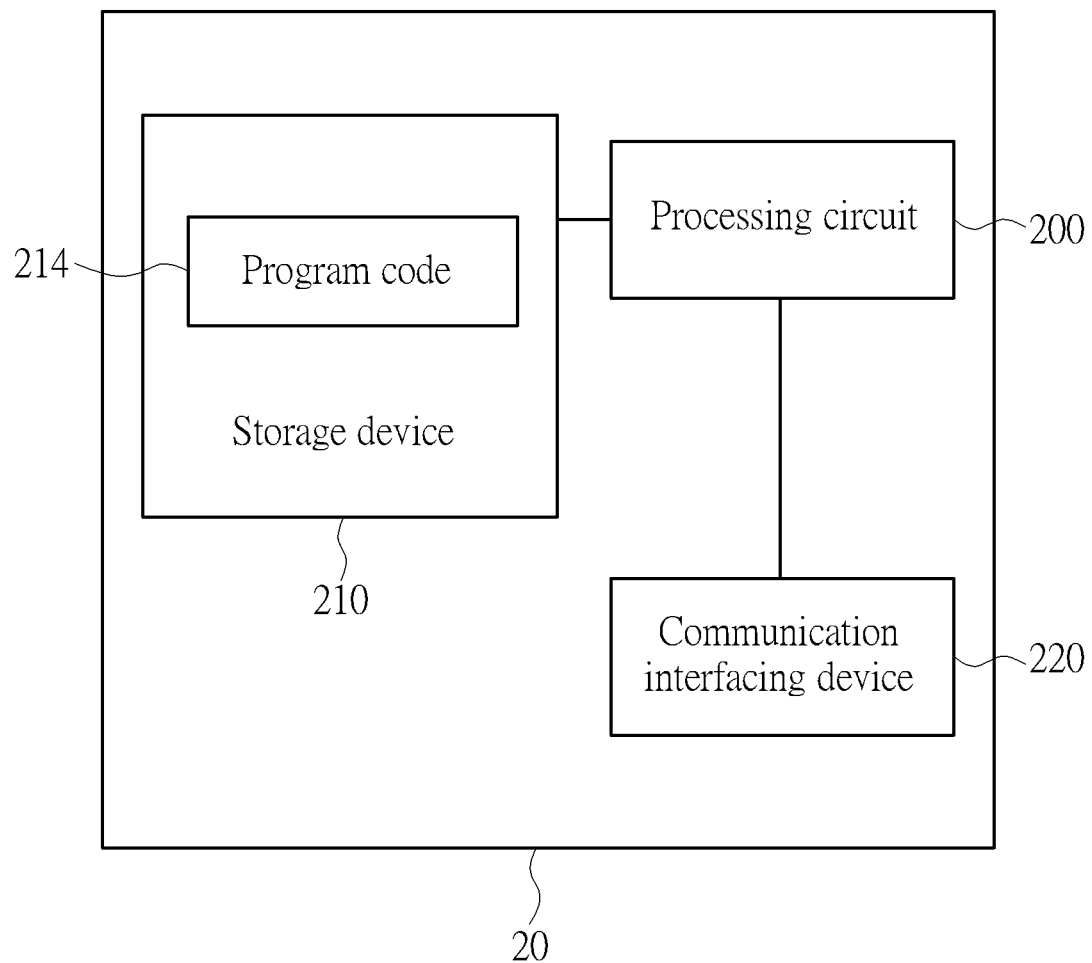
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
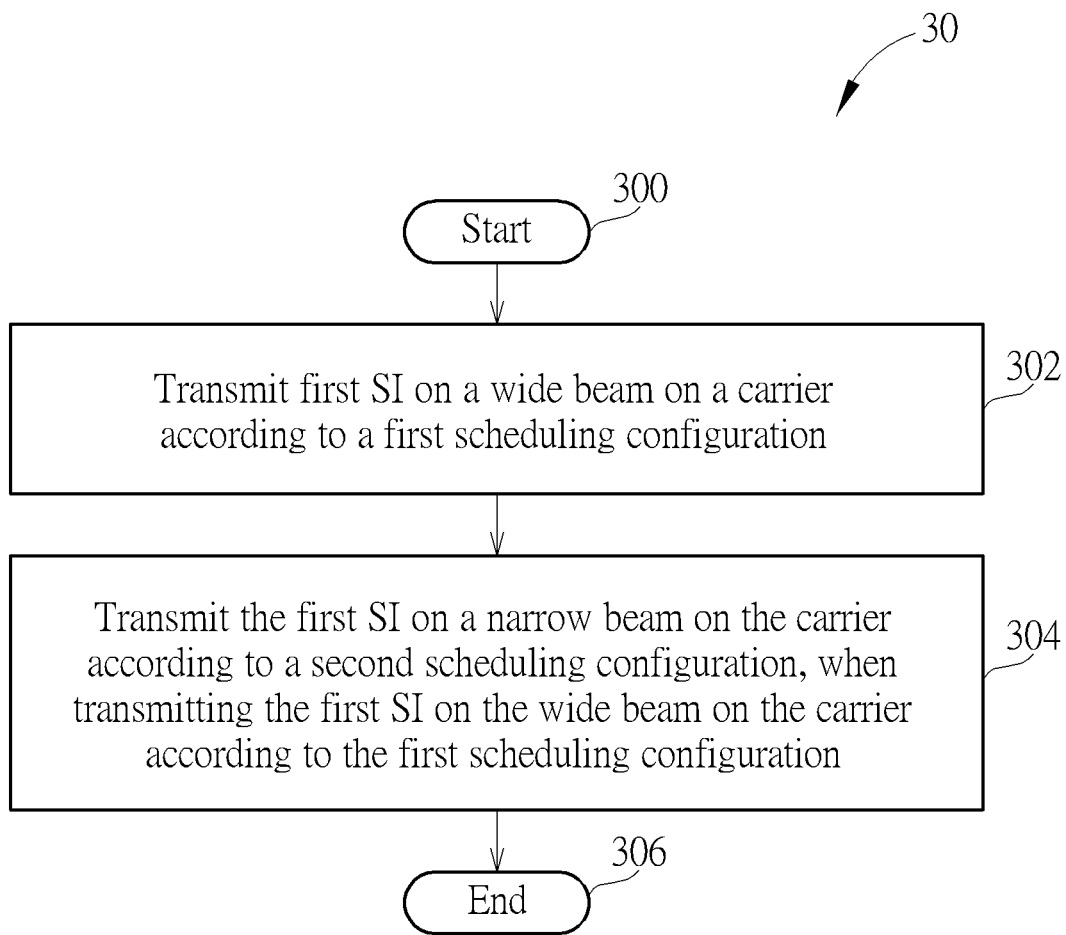
FIG. 3 is a flowchart of a process according to an example of the present invention.

FIG. 3 is a flowchart of a process 30 according to an example of the present invention. The process 30 is utilized in a BS in a network shown in FIG. 1, to transmit system information (SI) to a plurality of UEs and includes the following steps:

Step 300: Start.

Step 302: Transmit first SI on a wide beam on a carrier according to a first scheduling configuration.

Step 304: Transmit the first SI on a narrow beam on the carrier according to a second scheduling configuration, when transmitting the first SI on the wide beam on the carrier according to the first scheduling configuration.

Step 306: End.

According to the process 30, the network transmits the first SI to the plurality of UEs in different coverage areas in a cell. For example, a first UE in a first coverage area receives the first SI transmitted on the wide beam according to the first scheduling configuration. A second UE in a second coverage area may not receive the first SI transmitted on the wide beam, but may receive the first SI transmitted on the narrow beam according to the second scheduling configuration. The first and second UEs may be a same UE or different UEs. The first scheduling configuration and the second scheduling configuration may be same or different.

Realization of the process 30 is not limited to the above description. The following examples may be applied to the process 30.

In one example, the first scheduling configuration indicates that the network transmits the first SI on the wide beam in a first radio frame in every x radio frames, wherein x is an integer, e.g., 1, 2, . . . . In one example, the second scheduling configuration indicates that the network transmits the first SI on the narrow beam in a second radio frame in every y radio frames, wherein y is an integer, e.g. 1, 2, . . .

In one example, the first scheduling configuration indicates that the network transmits the first SI on the wide beam within a first time domain window which may periodically occur. The second scheduling configuration indicates that the network transmits the first SI on the narrow beam within a second time domain window which may periodically occur. In one example, the first and second time domain windows are overlapped or not overlapped. In one example, the first scheduling configuration indicates (e.g., includes) a first scheduling period indicating a first periodicity for the first SI being transmitted on the wide beam. The second scheduling configuration indicates (e.g., includes) a second scheduling period indicating a second periodicity for the first SI being transmitted on the narrow beam.

In one example, the first and second scheduling configurations may be defined in a standard specification, may be derived from a control channel or a RS, or may be received in other SI.

In one example, the first SI includes physical layer information of a cell (e.g., system bandwidth), a TDD configuration, the first scheduling period, the second scheduling period, a beam configuration, and/or information related to whether a UE of the plurality of UEs is allowed to access a cell. The first SI may further include a scheduling information of other SI blocks, common channel configuration, shared channel configuration and/or cell re-selection configuration.

In one example, the beam configuration includes a beam index identifying the narrow beam, a phase configuration, a beam RS configuration, a beam sweeping configuration for a UE to receive the narrow beam. In one example, the beaming sweeping configuration includes information related to how the network transmits the first SI on the narrow beam (e.g., sweeps the narrow beam) in a plurality of time instances (e.g., subframes or time slots). In one example, the beam configuration may not be broadcast in any SI but may be specified in standard specification(s).

In one example, the network transmits the first SI on the narrow beam according to a beam sweeping transmission. That is, the network sweeps (e.g., transmits) the narrow beam in a plurality of time instances (e.g., subframes or time slots). The UE may know how the network uses the beam sweeping transmission (i.e., how the network sweeps the narrow beam) according to the beam configuration. The UE may receive the first SI according to the beam configuration.

In one example, the network transmits second SI on the wide beam on the carrier. In one example, the second SI includes the second scheduling configuration for the plurality of UEs to receive the first SI transmitted on the narrow beam. The second scheduling configuration may further indicate a subframe number, a system frame number (SFN) or a beam index. In one example, the second SI includes the beam configuration. The UE may receive the first SI on the narrow beam on the carrier according to the beam configuration in the second system information. In one example, the second SI or third SI includes the first scheduling configuration. The first scheduling configuration may further indicate a subframe number or a SFN. In one example, the first scheduling period, the SFN and/or the subframe number is fixed and specified in a standard specification.

In one example, the first SI includes at least one information element (IE) including the second scheduling configuration. In one example, the first SI is a master information block (MIB) or a SI block (SIB). In one example, the second SI includes an information element including the second scheduling configuration. In one example, the second SI is a MIB or a SIB. In one example, the first SI is a SIB, and the second SI is a MIB. In another example, the first SI is a first SIB, and the second SI is a second SIB. In one example, the third SI includes at least one information element including the first scheduling configuration. In one example, the third SI is a MIB or a SIB.

Figure 4:
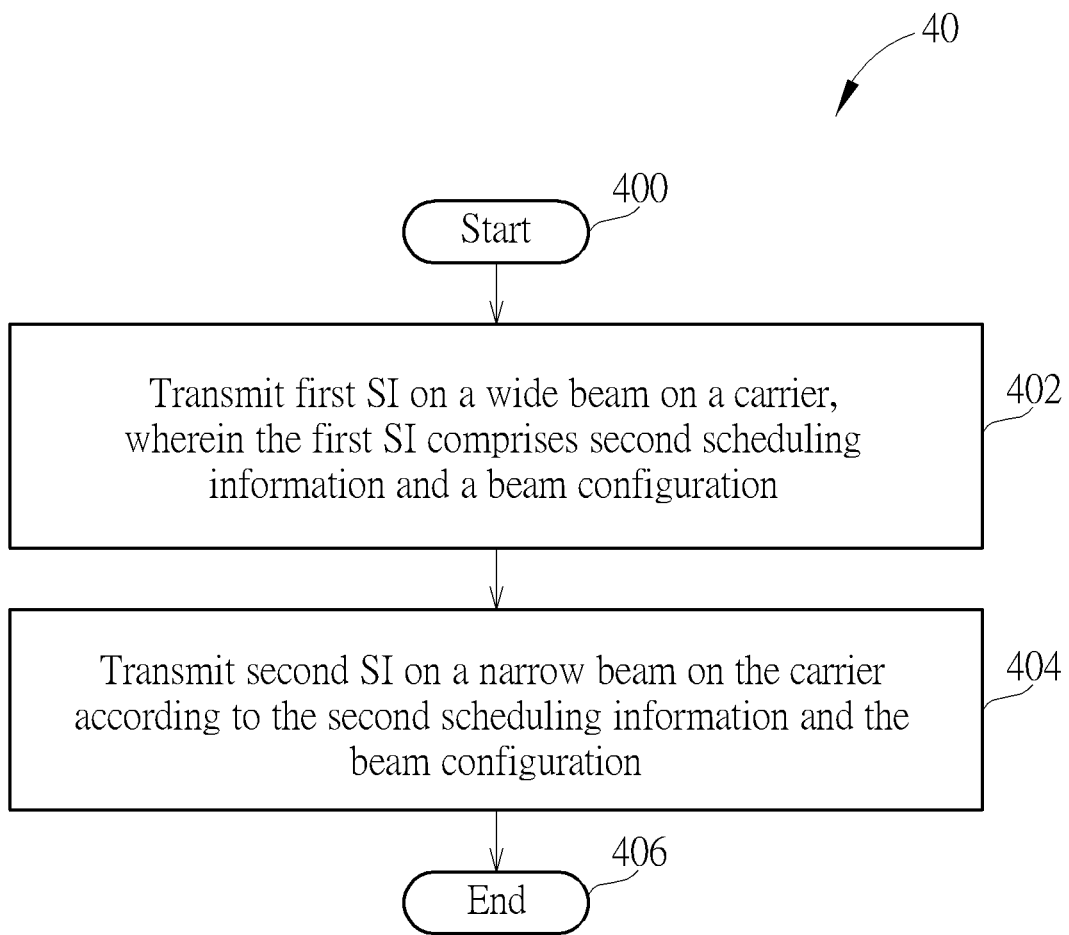
FIG. 4 is a flowchart of a process according to an example of the present invention.

FIG. 4 is a flowchart of a process 40 according to an example of the present invention. The process 40 is utilized in a BS in a network shown in FIG. 1, to transmit SI to a plurality of UEs and includes the following steps:

Step 400: Start.

Step 402: Transmit first SI on a wide beam on a carrier, wherein the first SI comprises second scheduling information and a beam configuration.

Step 404: Transmit second SI on a narrow beam on the carrier according to the second scheduling information and the beam configuration.

Step 406: End.

Realization of the process 40 is not limited to the above description. The following examples may be applied to the process 40.

In one example, the first SI includes physical layer information of a cell (e.g., system bandwidth), a TDD configuration, first scheduling information for other SI transmitted on the wide beam, information related to whether a UE of the plurality of UEs is allowed to access a cell. The first SI may further specify common channel configuration, shared channel configuration, cell re-selection configuration, a sidelink configuration, a Multimedia Broadcast Multicast Services (MBMS) configuration, a vehicle to everything (V2X) configuration, information related to Global Positioning System (GPS) time and/or Coordinated Universal Time (UTC). In one example, the beam configuration includes a beam index (or called a beam identifier), a phase configuration, a beam RS configuration and/or a beam sweeping configuration, for a UE of the plurality of UEs to receive the narrow beam. In one example, the beaming sweeping configuration includes information related to how the network transmits the second SI on the narrow beam in a plurality of time instances (e.g., subframes or time slots).

In one example, the network sweeps (e.g., transmits) the narrow beam in a plurality of time instances (e.g., subframes or time slots), when the network transmits the second SI on the narrow beam according to a beam sweeping transmission.

In one example, the second scheduling information includes a second scheduling period. In one example, the second scheduling information indicates a second subframe number or a second SFN to indicate a second time instance (i.e., which time instance) at which the second SI is transmitted. The second scheduling information may include a beam index identifying the narrow beam. The second scheduling period, the second SFN and/or the second subframe number is fixed and specified in standard specification(s). In one example, the first scheduling information includes a first scheduling period. In one example, the first scheduling information indicates a first subframe number or a first SFN to indicate a first time instance (i.e., which time instance) at which the other SI is transmitted. The first scheduling period, the first SFN and/or the first subframe number is fixed and specified in a standard specification. In one example, the second SI includes physical layer information of a cell (e.g., system bandwidth), a TDD configuration, information related to whether a UE of the plurality of UEs is allowed to access a cell. The second SI may further specify common channel configuration, shared channel configuration, cell re-selection information, a sidelink configuration, a MBMS configuration, a V2X configuration, information related to GPS time and/or UTC.

In one example, the first SI includes at least one IE including the information as described above. In one example, the first SI is a MIB or a SIB. In one example, the second SI includes at least one IE including the information as described above. In one example, the second SI is a MIB or a SIB, and third SI is a SIB.

Figure 5:
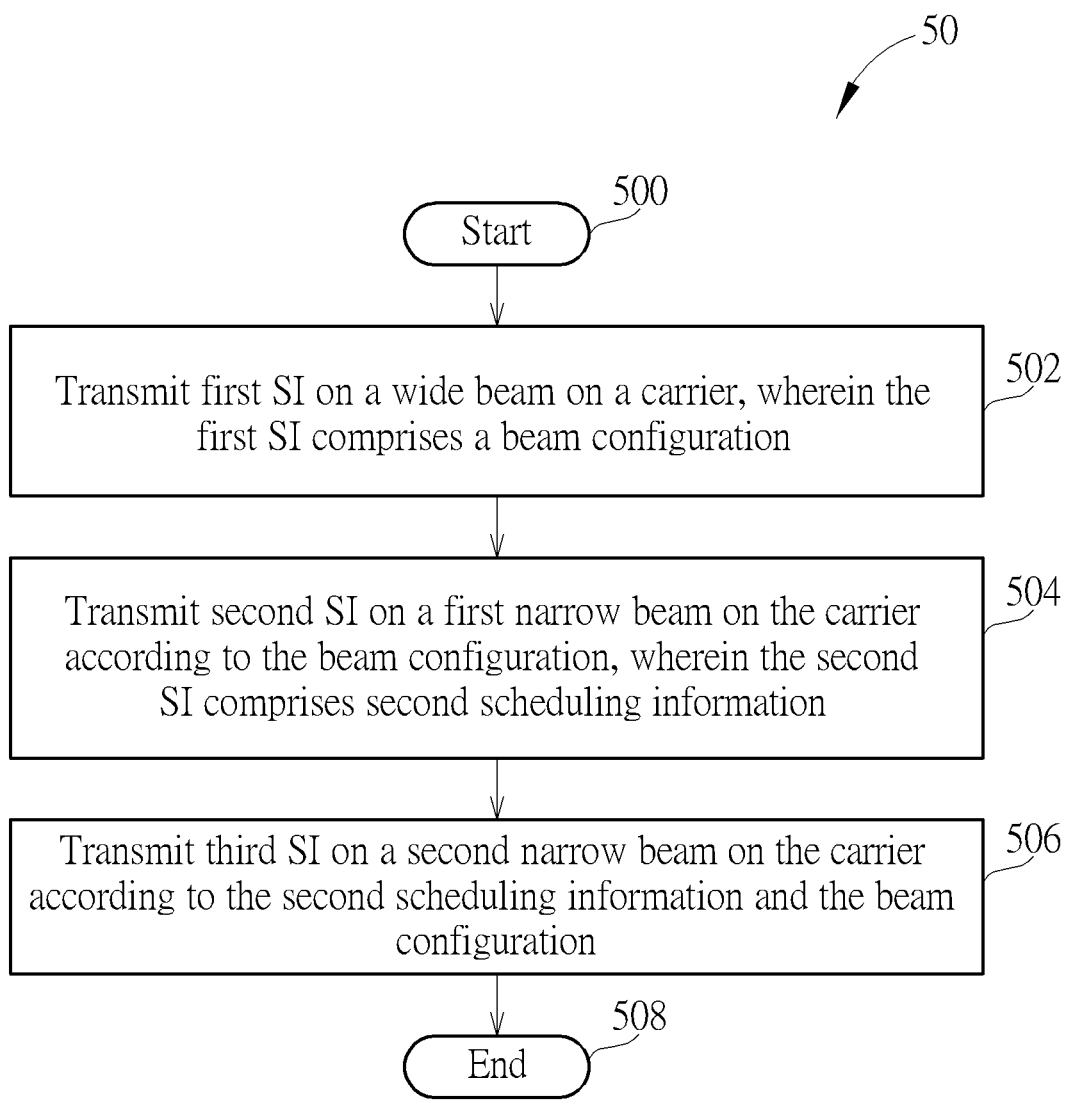
FIG. 5 is a flowchart of a process according to an example of the present invention.

FIG. 5 is a flowchart of a process 50 according to an example of the present invention. The process 50 is utilized in a BS in a network shown in FIG. 1, to transmit SI to a plurality of UEs and includes the following steps:

Step 500: Start.

Step 502: Transmit first SI on a wide beam on a carrier, wherein the first SI comprises a beam configuration.

Step 504: Transmit second SI on a first narrow beam on the carrier according to the beam configuration, wherein the second SI comprises second scheduling information.

Step 506: Transmit third SI on a second narrow beam on the carrier according to the second scheduling information and the beam configuration.

Step 508: End.

Realization of the process 50 is not limited to the above description. The examples related to the process 40 and the following examples may be applied to the process 50.

In one example, the first SI includes information/configuration as described in the process 40. In one example, the beam configuration includes a beam index, a phase configuration, a beam RS configuration, abeam sweeping configuration, etc., for a UE of the plurality of UEs to receive the second narrow beam. In one example, the beaming sweeping configuration includes information related to how the network transmits the third SI on the second narrow beam in a plurality of time instances (e.g., subframes or time slots).

In one example, the network sweeps (e.g., transmits) the first narrow beam and the second narrow beam in a plurality of time instances (e.g., subframes or time slots), when the network transmits the second SI and the third SI on the first narrow beam and the second narrow beam according to a beam sweeping transmission.

In one example, the second scheduling information includes a second scheduling period. In one example, the second scheduling information indicates a second subframe number or a second SFN to indicate a second time instance (i.e., which time instance) at which the third SI is transmitted. The second scheduling information may include a beam index identifying the second narrow beam. The second scheduling period, the second SFN and/or the second subframe number is fixed and specified in standard specification (s). In one example, the first scheduling information includes a first scheduling period. In one example, the first scheduling information indicates a first subframe number or a first SFN to indicate a first time instance (i.e., which time instance) at which the other SI is transmitted. The first scheduling period, the first SFN and/or the first subframe number is fixed and specified in standard specification(s). In one example, the second SI includes physical layer information of a cell (e.g., system bandwidth), a TDD configuration, information related to whether a UE of the plurality of UEs is allowed to access a cell. The second SI may further specify common channel configuration, shared channel configuration, cell re-selection information, a sidelink configuration, a MBMS configuration, a V2X configuration, information related to GPS time and/or UTC.

Figure 6:
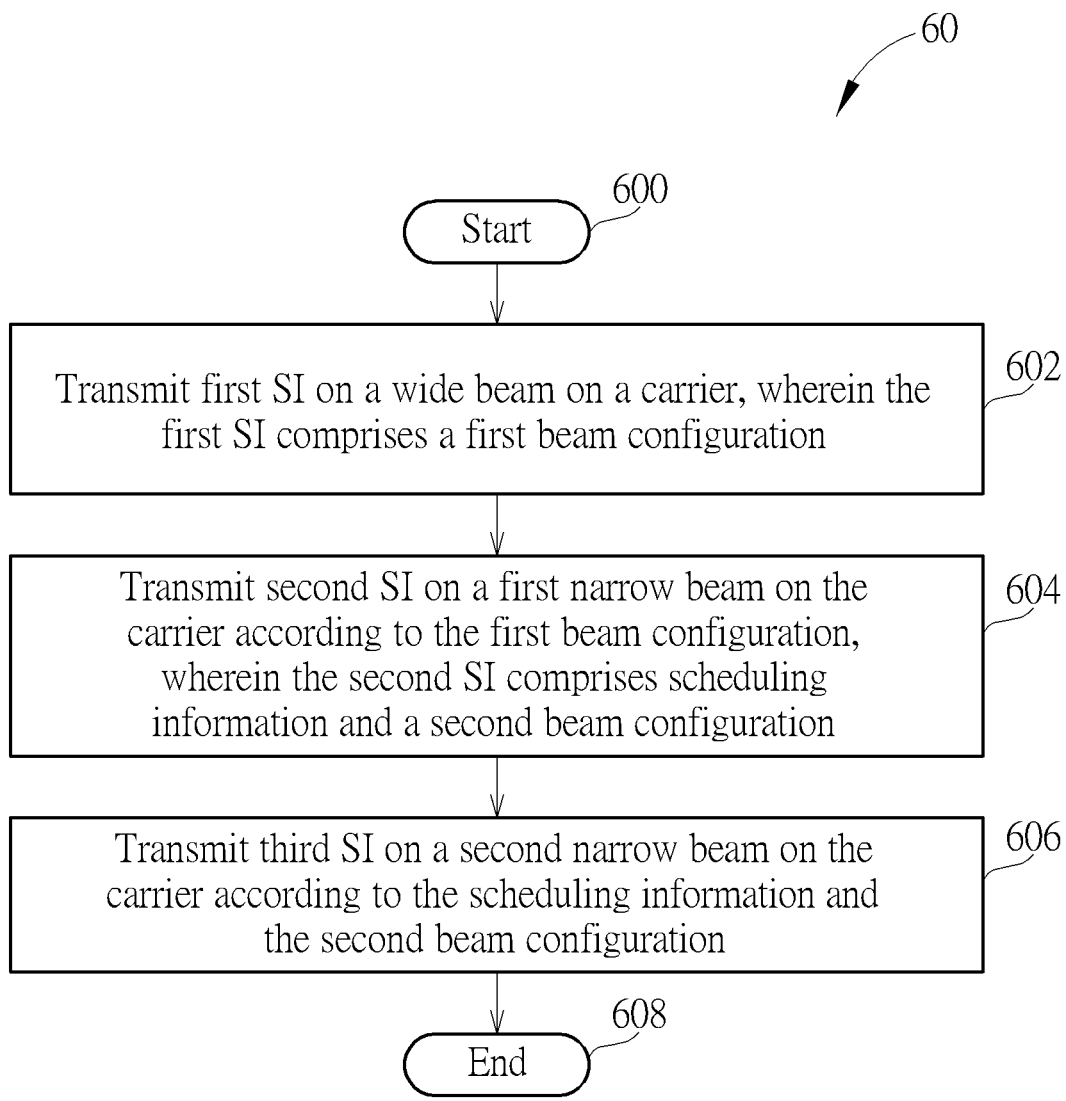
FIG. 6 is a flowchart of a process according to an example of the present invention.

FIG. 6 is a flowchart of a process 60 according to an example of the present invention. The process 60 is utilized in a network (e.g., a BS or a TRP) shown in FIG. 1, to transmit SI to a plurality of UEs and includes the following steps:

Step 600: Start.

Step 602: Transmit first SI on a wide beam on a carrier, wherein the first SI comprises a first beam configuration.

Step 604: Transmit second SI on a first narrow beam on the carrier according to the first beam configuration, wherein the second SI comprises scheduling information and a second beam configuration.

Step 606: Transmit third SI on a second narrow beam on the carrier according to the scheduling information and the second beam configuration.

Step 608: End.

Realization of the process 60 is not limited to the above description. The following examples may be applied to the process 60.

The difference between the process 50 and the process 60 is that the network may transmit one more beam configuration (i.e., the second beam configuration) for a UE of the plurality of UEs to receive the third SI. The examples related to the process 50 may be applied to the process 60, and are not narrated herein.

In one example, the first beam configuration includes at least one of a first beam index identifying the first narrow beam, a first phase configuration, a first beam RS configuration and a first beam sweeping configuration, etc., for the UE to receive the first narrow beam. In one example, the first beam sweeping configuration includes information related to how the network transmits the second SI on the first narrow beam in a plurality of time instances. In one example, the second beam configuration includes at least one of a second beam index identifying the second narrow beam, a second phase configuration, a second beam RS configuration and a second beam sweeping configuration, etc., for the UE to receive the second narrow beam. In one example, the second beam sweeping configuration includes information related to how the network transmits the third SI on the second narrow beam in a plurality of time instances.

Realization of the processes 30-60 are limited to the above description. The following examples can be derived according to the above description.

Figure 7:
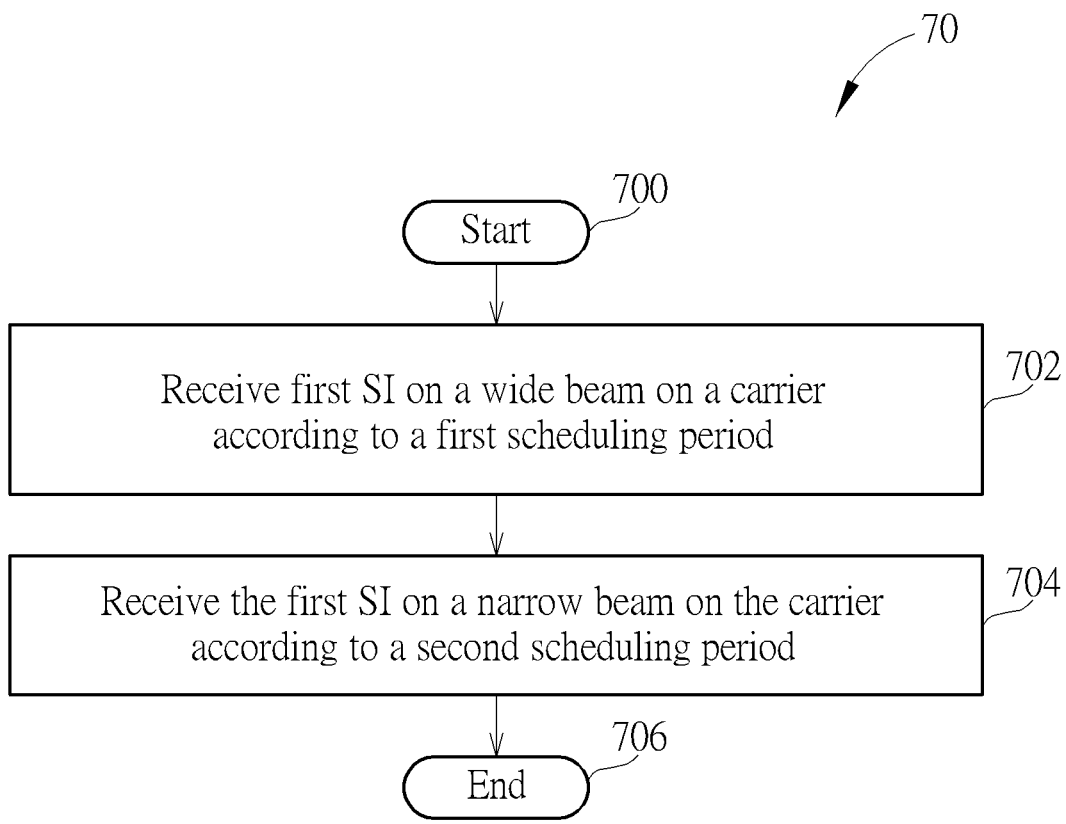
FIG. 7 is a flowchart of a process according to an example of the present invention.

FIG. 7 is a flowchart of a process 70 according to an example of the present invention. The process 70 is utilized in a UE shown in FIG. 1, to receive SI from a network and includes the following steps:

Step 700: Start.

Step 702: Receive first SI on a wide beam on a carrier according to a first scheduling period.

Step 704: Receive the first SI on a narrow beam on the carrier according to a second scheduling period.

Step 706: End.

The examples related to the process 30 may be applied to the process 70, and are not narrated herein.

Realization of the process 70 is not limited to the above description. The following examples may be applied to the process 70.

In one example, the UE determines to receive the first SI on a narrow beam on the carrier according to the second scheduling period, when the UE is not able to receive the first system information on the wide beam on the carrier. In one example, the UE determines to receive the first SI on a narrow beam on the carrier according to the second scheduling period, when the UE is not able to detect a RS on the wide beam or when quality of the RS detected on the wide beam is below a threshold. The threshold may be defined in the standard specification(s), or may be received by the UE in the first SI or the second SI.

In one example, the UE receives (or acquires) the beam configuration from the network to receive the first SI on the narrow beam. In one example, the UE does not receive the beam configuration from the network, and the UE receives (or acquires) the first SI on the narrow beam according to a predetermined (or default) beam configuration. The UE may derive the predetermined beam configuration from a physical cell identity or a physical TRP identity. In one example, the predetermined beam configuration is specified in the standard specification(s).

Figure 8:
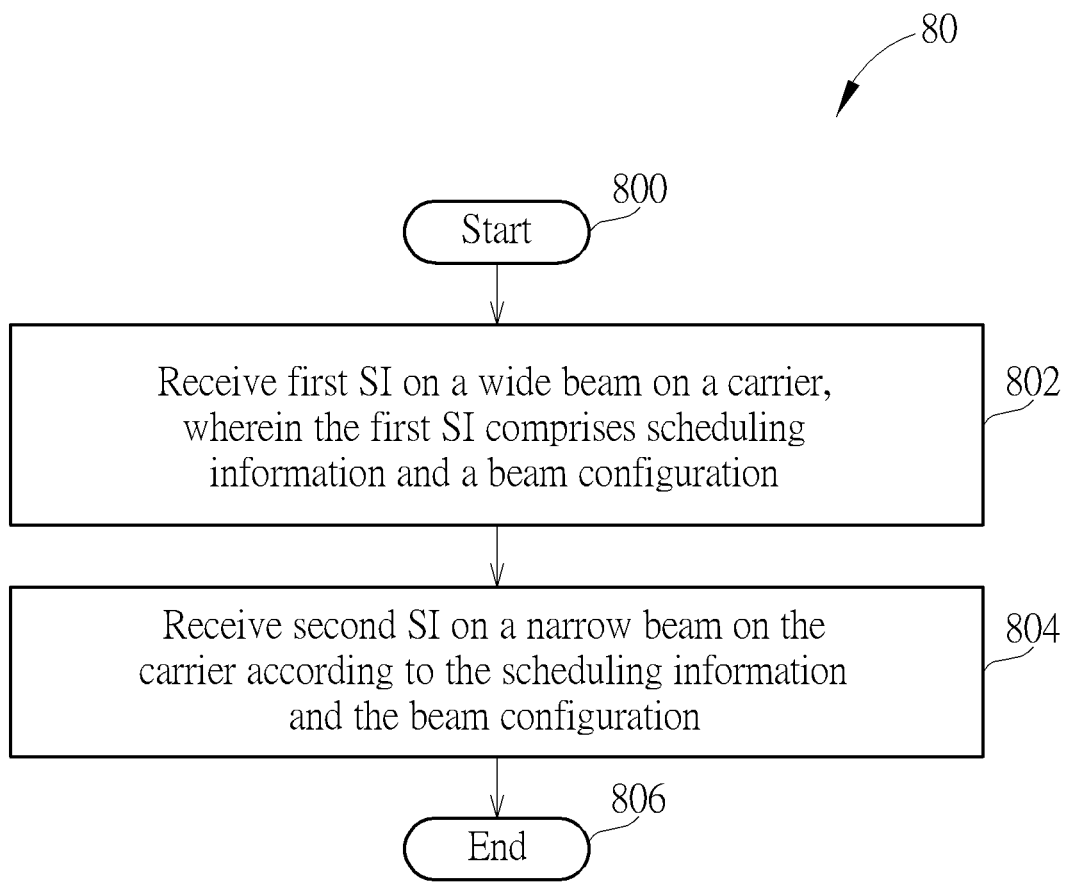
FIG. 8 is a flowchart of a process according to an example of the present invention.

FIG. 8 is a flowchart of a process 80 according to an example of the present invention. The process 80 is utilized in a UE shown in FIG. 1, to receive SI from a network and includes the following steps:

Step 800: Start.

Step 802: Receive first SI on a wide beam on a carrier, wherein the first SI comprises scheduling information and a beam configuration.

Step 804: Receive second SI on a narrow beam on the carrier according to the scheduling information and the beam configuration.

Step 806: End.

The examples related to the process 40 may be applied to the process 80, and are not narrated herein.

Realization of the process 80 is not limited to the above description. The following examples may be applied to the process 80.

In one example, the UE determines to receive the second SI on the narrow beam on the carrier, when the UE is not able to receive the first SI on the wide beam on the carrier. In one example, the UE determines to receive the second SI on the narrow beam on the carrier, when the UE is not able to detect a RS on the wide beam or when quality of the RS detected on the wide beam is below a threshold. The threshold may be defined in the standard specification(s), or may be received by the UE in the first SI or other SI transmitted on the wide beam on the carrier.

Figure 9:
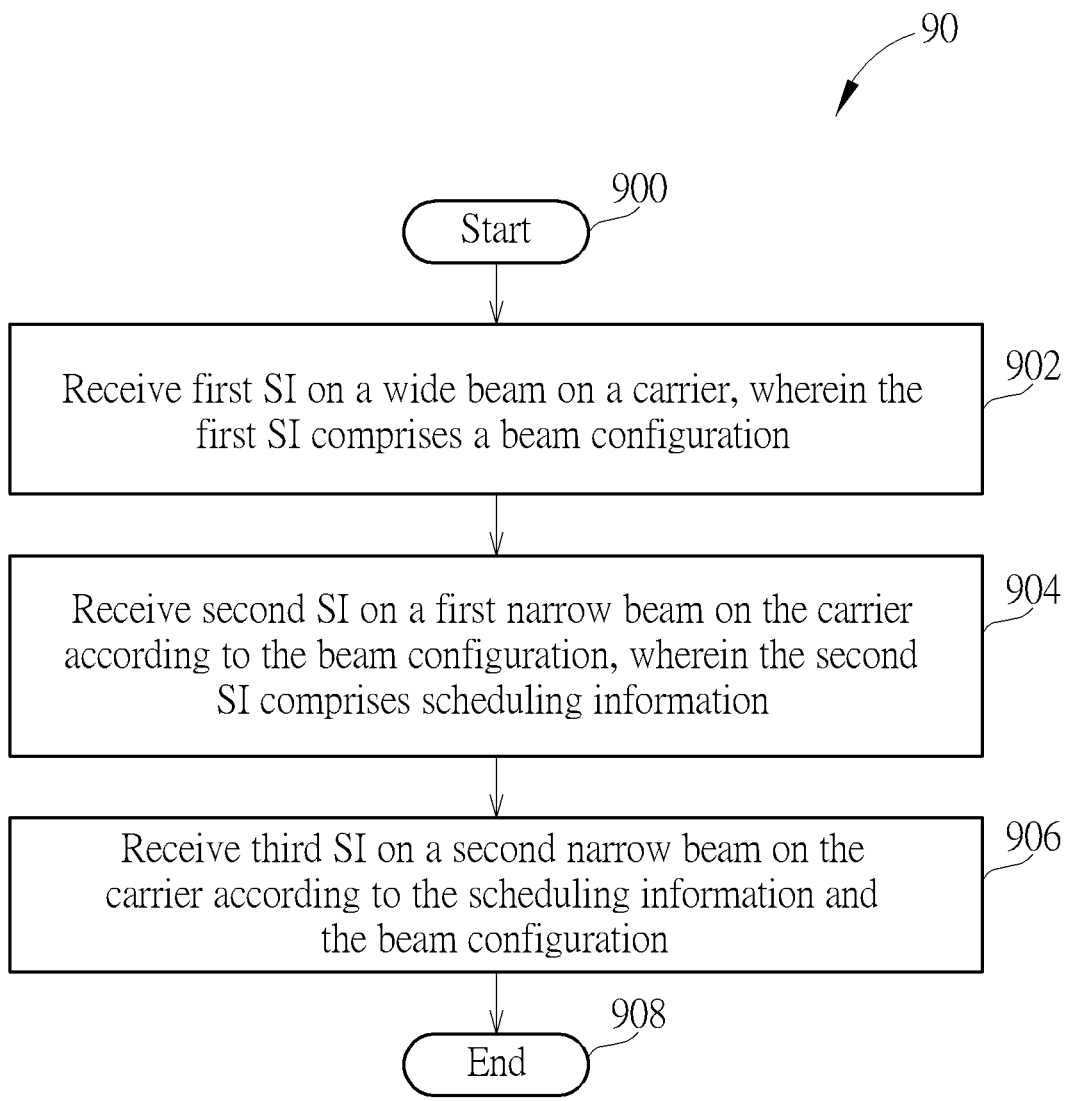
FIG. 9 is a flowchart of a process according to an example of the present invention.

FIG. 9 is a flowchart of a process 90 according to an example of the present invention. The process 90 is utilized in a UE shown in FIG. 1, to receive SI from a network and includes the following steps:

Step 900: Start.

Step 902: Receive first SI on a wide beam on a carrier, wherein the first SI comprises a beam configuration.

Step 904: Receive second SI on a first narrow beam on the carrier according to the beam configuration, wherein the second SI comprises scheduling information.

Step 906: Receive third SI on a second narrow beam on the carrier according to the scheduling information and the beam configuration.

Step 906: End.

The examples related to the process 50 may be applied to the process 90, and are not narrated herein.

Realization of the process 90 is not limited to the above description. The following examples may be applied to the process 90.

In one example, the UE determines to receive at least one of the second and the third SIs on a narrow beam on the carrier, when the UE is not able to receive the first system information on the wide beam on the carrier. In one example, the UE determines to receive at least one of the second and the third SIs on a narrow beam on the carrier, when the UE is not able to detect a RS on the wide beam or when quality of the RS detected on the wide beam is below a threshold. The threshold may be defined in the standard specification(s), or may be received by the UE in the first SI or other SI transmitted on the wide beam on the carrier.

Figure 10:
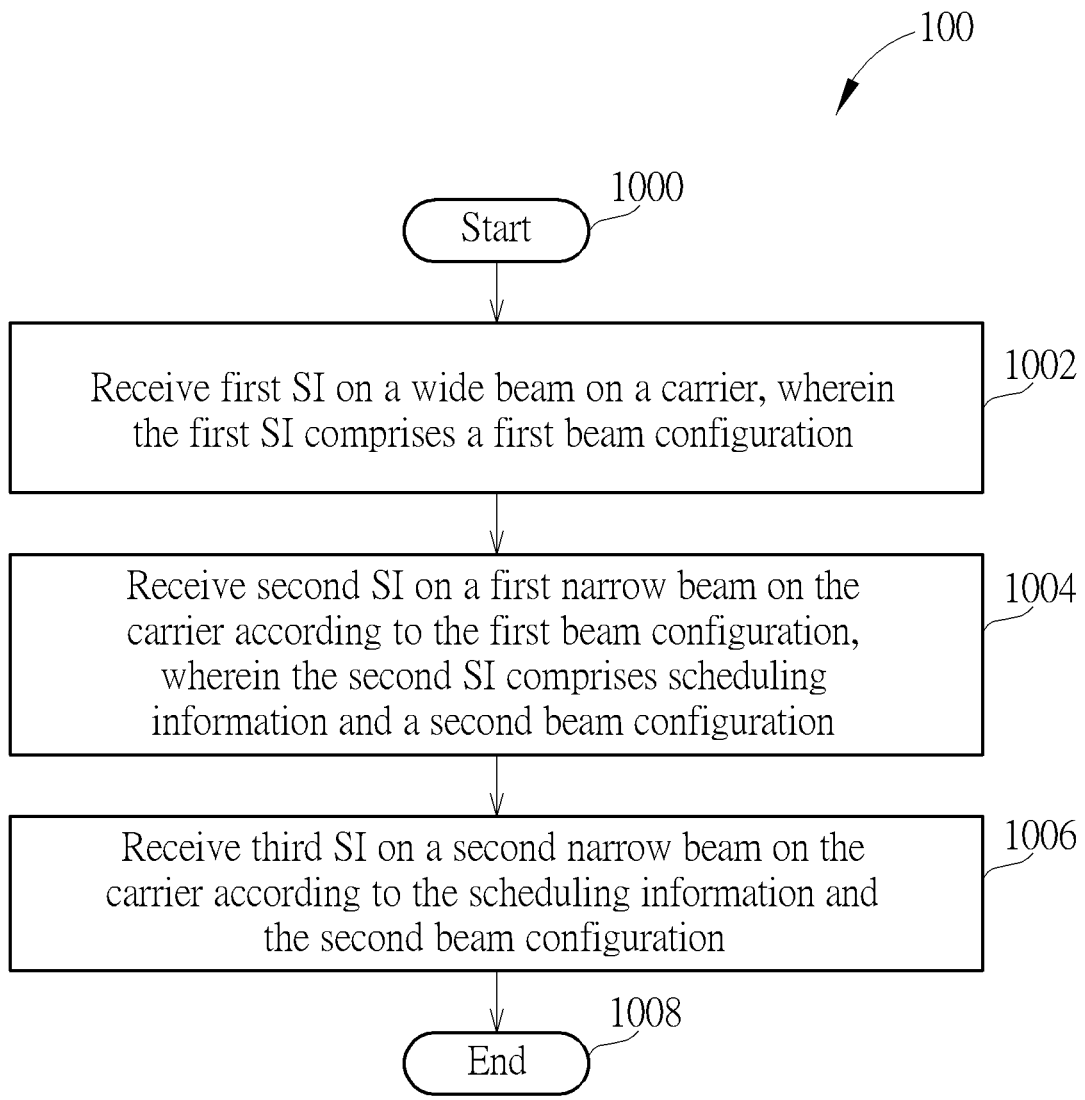
FIG. 10 is a flowchart of a process according to an example of the present invention.

FIG. 10 is a flowchart of a process 100 according to an example of the present invention. The process 100 is utilized in a UE shown in FIG. 1, to receive SI from a network and includes the following steps:

Step 1000: Start.

Step 1002: Receive first SI on a wide beam on a carrier, wherein the first SI comprises a first beam configuration.

Step 1004: Receive second SI on a first narrow beam on the carrier according to the first beam configuration, wherein the second SI comprises scheduling information and a second beam configuration.

Step 1006: Receive third SI on a second narrow beam on the carrier according to the scheduling information and the second beam configuration.

Step 1006: End.

The examples related to the process 60 may be applied to the process 100, and are not narrated herein.

Realization of the process 100 is not limited to the above description. The following examples may be applied to the process 100.

In one example, the UE determines to receive at least one of the second and the third SIs on a narrow beam on the carrier, when the UE is not able to receive the first SI on the wide beam on the carrier. In one example, the UE determines to receive at least one of the second and the third SIs on a narrow beam on the carrier, when the UE is not able to detect a RS on the wide beam or when quality of the RS detected on the wide beam is below a threshold. The threshold may be defined in the standard specification(s), or may be received by the UE in the first SI or other SI transmitted on the wide beam on the carrier.

In one example, the network transmits the SI on a plurality of narrow beams towards different directions at a time instance. A beam configuration includes information related to how the UE receives the SI on the plurality of narrow beams. In one example, the UE synchronizes to a narrow beam of the plurality of narrow beams according to the beam configuration and receives the SI on the narrow beam.

In one example, the wide beam and the narrow beam(s) as described above form a coverage area of a cell of the network. The SI as described above is transmitted by a same TRP, a same BS, different TRPs or different BSs on the wide beam and the narrow beam(s). The SI includes a list of neighboring cells of the cell and a beam configuration for each of the neighboring cells. The UE synchronizes to a narrow beam of a neighboring cell for a cell selection or a reselection according to the beam configuration of the neighboring cell. After synchronizing the narrow beam, the UE acquires the SI on the narrow beam.

In one example, a beam sweeping configuration includes a sweeping period or a sweeping interval for a narrow beam or a plurality of narrow beams. The beam sweeping configuration includes a sweeping subframe configuration. The sweeping subframe configuration indicates an association between a plurality of subframes and a narrow beam. For example, a first plurality of subframes is transmitted by a BS/TRP for a DL or by the UE for a UL on a first narrow beam and a second plurality of subframes (i.e., sweeping subframes) is transmitted by the BS/TRP for the DL or by the UE for the UL on a second narrow beam. In one example, the first plurality of subframes and the second plurality of subframes are not overlapped. In one example, one of the first plurality of subframes and one of the second plurality of subframes is overlapped. An overlapped subframe is transmitted on one of the first narrow beam and the second narrow beam. The UE should detect the overlapped subframe transmitted on the one of the first narrow beam and the second narrow beam.

In one example, a scheduling configuration for SI transmitted on a narrow beam is associated to the beam sweeping configuration. For example, a scheduling period of the SI transmitted on the narrow beam associates to the sweeping period or an interval. A subframe number in the scheduling configuration associates to a subframe in a plurality of subframes in the beam sweeping configuration. The subframe is transmitted by at least one BS or TRP on at least one narrow beam in the beam sweeping configuration. The UE acquires the SI on the narrow beam according to the scheduling configuration and the beam sweeping configuration. In one example, the beam sweeping configuration is included in the SI or other SI on the narrow beam which is transmitted by a BS. The UE synchronizes to the narrow beam, before acquiring the SI or the other SI. When the UE synchronizes to the narrow beam, the UE performs a subframe and/or frame synchronization. Then, the UE acquires the SI or the other SI on the narrow beam blindly or according to a fixed location in subframe(s), before receiving the SI or the other SI on the narrow beam. The fixed location is specified in standard specification(s). The UE acquires the SI or the other SI according to the beam sweeping configuration and the scheduling configuration, when receiving the SI or the other SI on the narrow beam.

Figure 11:
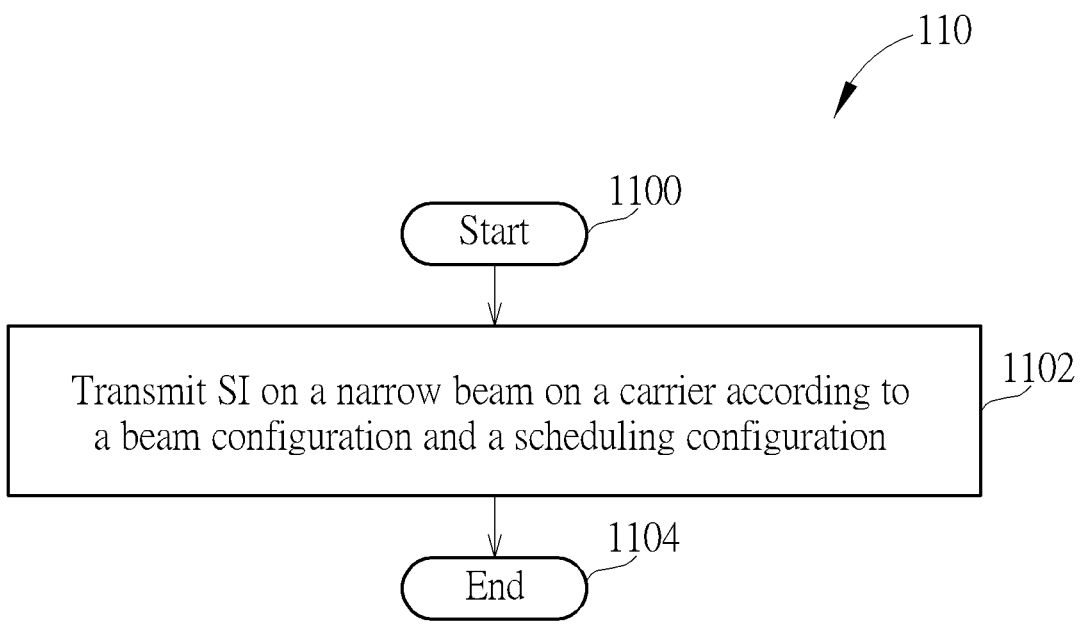
FIG. 11 is a flowchart of a process according to an example of the present invention.

FIG. 11 is a flowchart of a process 110 according to an example of the present invention. The process 110 is utilized in a BS in a network shown in FIG. 1, to transmit SI to a plurality of UEs and includes the following steps:

Step 1100: Start.

Step 1102: Transmit SI on a narrow beam on a carrier according to a beam configuration and a scheduling configuration.

Step 1104: End.

Figure 12:
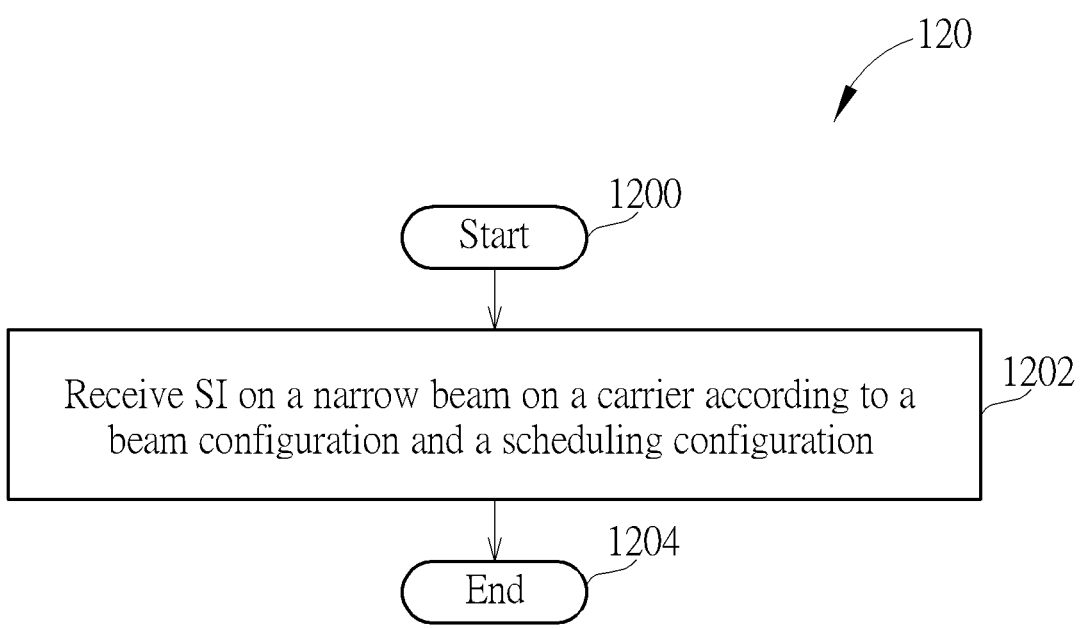
FIG. 12 is a flowchart of a process according to an example of the present invention.

FIG. 12 is a flowchart of a process 120 according to an example of the present invention. The process 120 is utilized in a UE shown in FIG. 1, to receive SI from a network and includes the following steps:

Step 1200: Start.

Step 1202: Receive SI on a narrow beam on a carrier according to a beam configuration and a scheduling configuration.

Step 1204: End.

Realization of the processes 110-120 is not limited to the above description. The examples of the process above and the following examples may be applied to the processes 110-120.

In one example, the UE does not receive a transmission on a wide beam according to a beam configuration. In one example, the UE receives a transmission on the wide beam according to a cell search procedure and a synchronization procedure. That is, the UE synchronizes to a first SS/RS on the wide beam and synchronizes to a second SS/RS on the narrow beam.

The following examples may be applied to the processes above.

The wide beam is wider than the narrow beam. In one example, the wide beam may include a sector beam or may be an omni-directional beam. In one example, the wide beam may be included in an omni-directional beam which includes a plurality of wide beams or a single beam to form a coverage area of a cell of the network.

The common control configuration may comprise at least one of a physical downlink control channel (PDCCH) configuration and a random access configuration. The UE may receive a SI described above according to the PDCCH configuration. The UE may receive PDCCH(s) configured in the PDCCH configuration to receive SI(s).

"subframe" may be changed to "slot" or any time unit.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling system information in a wireless communication system. The network transmits system information on both a wide beam (or an omni-directional beam) and narrow beam(s). The UEs in different coverage areas in a cell receives the system information on different beams on a carrier. Thus, the problem how to handle system information is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for transmitting system information (SI) to a plurality of communication devices, comprising:
   a storage device, for storing instructions of:
   transmitting first SI on a wide beam on a carrier, wherein the first SI comprises a first beam configuration;
   transmitting second SI on a first narrow beam on the carrier according to the first beam configuration, wherein the second SI comprises scheduling information and a second beam configuration; and
   transmitting third SI on a second narrow beam on the carrier according to the scheduling information and the second beam configuration;
   wherein the first beam configuration comprises at least one of a first beam index identifying the first narrow beam, a first phase configuration, a first beam reference signal (RS) configuration and a first beam sweeping configuration for a communication device to receive the first narrow beam; and
   wherein the scheduling information includes a scheduling period or indicates a subframe number or a System Frame Number (SFN) to indicate a time instance at which the second SI is transmitted; and
   a processing circuit, coupled to the storage device, configured to execute the instructions stored in the storage device.

2. The network of claim 1, wherein the first beam sweeping configuration comprises information related to how the network transmits the second SI on the first narrow beam in a plurality of time instances.

3. The network of claim 1, wherein the second beam configuration comprises at least one of a second beam index identifying the second narrow beam, a second phase configuration, a second beam RS configuration and a second beam sweeping configuration for the communication device to receive the second narrow beam.

4. The network of claim 3, wherein the second beam sweeping configuration comprises information related to how the network transmits the third SI on the second narrow beam in a plurality of time instances.

5. A communication device for receiving system information (SI) from a network, comprising:
   a storage device, for storing instructions of:
   receiving first SI on a wide beam on a carrier, wherein the first SI comprises a first beam configuration;
   receiving second SI on a first narrow beam on the carrier according to the first beam configuration, wherein the second SI comprises scheduling information and a second beam configuration; and
   receiving third SI on a second narrow beam on the carrier according to the scheduling information and the second beam configuration;
   wherein the first beam configuration comprises at least one of a first beam index identifying the first narrow beam, a first phase configuration, a first beam reference signal (RS) configuration and a first beam sweeping configuration for the communication device to receive the first narrow beam; and
   wherein the scheduling information includes a scheduling period or indicates a subframe number or a System Frame Number (SFN) to indicate a time instance at which the second SI is transmitted; and a processing circuit, coupled to the storage device, configured to execute the instructions stored in the storage device.

6. The communication device of claim 5, wherein the storage device further stores the instruction of:
   determining to receive at least one of the second SI and the third SI on a narrow beam on the carrier, when the communication device is not able to receive the first SI on the wide beam on the carrier.

7. The communication device of claim 5, wherein the storage device further stores the instruction of:
   determining to receive at least one of the second SI and the third SI on a narrow beam on the carrier, when the communication device is not able to detect a reference signal (RS) on the wide beam or when quality of the RS detected on the wide beam is below a threshold.

8. The communication device of claim 7, wherein the threshold is defined in a standard specification, or is received by the communication device in the first SI or other SI transmitted on the wide beam on the carrier.

9. The communication device of claim 5, wherein the storage device further stores the instructions of:
   synchronizing to a narrow beam of a plurality of narrow beams according to a beam configuration; and
   receiving SI on the narrow beam, after synchronizing to the narrow beam.

10. The communication device of claim 9, wherein the SI comprises a list of neighboring cells of the cell and the beam configuration for each of the neighboring cells.

* * * * *